Feb. 12, 1963 P. L. STANTON 3,077,191
ANESTHETIZING AND RESUSCITATING APPARATUS
Filed May 24, 1957 6 Sheets-Sheet 2

PHILIP L. STANTON
INVENTOR.

BY Paul A. Weilein
ATTORNEY.

Feb. 12, 1963   P. L. STANTON   3,077,191
ANESTHETIZING AND RESUSCITATING APPARATUS
Filed May 24, 1957   6 Sheets-Sheet 4

PHILIP L. STANTON
INVENTOR.

BY
Paul A. Weilein
ATTORNEY.

Feb. 12, 1963　　　　P. L. STANTON　　　　3,077,191
ANESTHETIZING AND RESUSCITATING APPARATUS
Filed May 24, 1957　　　　　　　　　　6 Sheets-Sheet 5

PHILIP L. STANTON
INVENTOR.

BY Paul A. Weilein
ATTORNEY.

United States Patent Office 3,077,191
Patented Feb. 12, 1963

3,077,191
ANESTHETIZING AND RESUSCITATING APPARATUS
Philip L. Stanton, 389 Flintridge Oaks, Pasadena 3, Calif.
Filed May 24, 1957, Ser. No. 661,466
2 Claims. (Cl. 128—29)

This invention relates to apparatus for controlling respiration and anesthesia during surgical operations.

It is of vital importance to the well being of the patient and the successful outcome of surgical procedure that the anesthetic mixture being administered to the patient be kept as uniform as possible as to percentage and volume. With anesthesia administering apparatus heretofore available, satisfactory uniformity of the anesthetic mixture has not been achieved due to the construction and arrangement of the apparatus and the fact that the patient is required to rebreathe the mixture. Consequently, in the use of such apparatus, the depth of anesthesia varies constantly during surgery and presents a grave problem in many cases.

In the field of veterinary surgery, but few surgeons have attempted thoracic surgery with the apparatus heretofore available, due to the complicated nature of the apparatus and the necessity of employing a skilled anesthetist for the operation thereof. Consequently it has been the practice to resort to anesthetic drugs administered by needle into the blood stream. These drugs have a depressing effect upon the circulation of the animal and result in a high mortality rate during and after critical surgery, especially with aged animals.

It is an object of the present invention to provide novel and highly efficient apparatus for controlling respiration and anesthesia in a manner which will eliminate the objections and hazards heretofore encountered in administering anesthetics.

It is another object of the invention to provide novel unitary apparatus which combines the functions of an anesthetizer and a pulmometrically controlled, controlled by the pressure in the lungs of a patient, gas-operated resusciator in a manner making it possible to exert predetermined positive and negative intra-pulmonary pressures under desired control while administering an anesthetic gas or vapor in combination with oxygen or air or a mixture of gases.

It is another object of this invention to provide apparatus such as next above described which makes it unnecessary for the patient to rebreathe the anesthetic mixture administered by the apparatus, and which delivers to the patient a uniform anesthetic mixture in a manner assuring that the patient may be maintained at the desired depth of anesthesia throughout an entire surgical operation.

It is another object hereof to provide apparatus such as described which is subject to operation and control in a manner making it unnecessary to inject depressing anesthetic drugs into the blood stream.

Another object hereof is to provide apparatus such as described which makes it possible for the surgeon to perform thoracic and other critical surgery with reasonable assurance as to the survival of the patient in cases which, under former modes of administering anesthetics, would be considered poor or impossible surgical risks.

It is another object of this invention to provide apparatus such as described which may be accurately operated in a particularly easy manner to change the degree of positive pressure for inflation of the lungs of a patient during thoracic surgery and safely to maintain the lungs inflated the desired extent.

Another object of the invention is to provide a combined anesthetizer and resuscitator such as described in the form of a compact and simply constructed unit which is capable of ready and selective operation to administer an anesthetic mixture or pure oxygen in various ways and in varying amounts and rates, best suited to all circumstances attending anesthesia and post anesthesia conditions of surgical patients. The change of operation of the apparatus from one phase to the other may be quickly effected and this is most important as it enables the surgeon quickly to meet any emergency or condition, such as the need for allowing the patient to inhale a mixture of oxygen and an anesthetic or oxygen without an anesthetic, or for cyclical operation of the apparatus as a resuscitator to induce breathing while administering the anesthetic, or for operation of the apparatus solely as a resuscitator, or for "washing out" the anesthetic by resuscitation.

A further object of this invention is to provide in a combined anesthetizer and insufflator unit, a novel system of controls readily selectively operable to vary the proportions of anesthetic and oxygen mixture, to administer pure oxygen or a mixture of oxygen and an anesthetic, to induce automatic breathing of the patient while administering the anesthetic mixture, or to induce automatic breathing with pure oxygen, in all instances without requiring rebreathing of any of the gases that have been administered.

This invention possesses many other advantages and has other objects which may be made more easily apparent from a consideration of one embodiment of the invention shown in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

One of the important provisions of the apparatus is that it includes means operable to deliver to the patient an accurately metered anesthetic mixture and to discharge the mixture from the patient's lungs to the atmosphere. This eliminates rebreathing of the mixture and makes it possible together with the control means to maintain the desired uniform anesthetic mixture as to percentage and volume and a resultant desired depth of anesthesia throughout an entire surgical operation.

Another important provision in the functioning of the apparatus hereof is that, during thoracic surgery, it is possible readily to change the amount of positive pressure or degree of inflation of the patient's lungs during the inhalation phase of the automatic breathing cycle of the apparatus. Thus, the surgeon may select and maintain with safety the desired degree of inflation according to the surgical requirements at hand.

During thoracic surgery when the incision in the chest wall is to be closed, it is necessary to restore the natural vacuum in this cavity. With the apparatus of this invention it is possible readily to change the operation of the machine from the resuscitation or automatic breathing cycle to the continuous positive pressure or insufflation phase and thus hold the lungs properly inflated while closing the incision. After closing the incision, the surgeon may quickly adjust the apparatus to operate as a resuscitator and thereby activate the lungs in a manner restoring the vacuum in the chest cavity.

Figure 1:
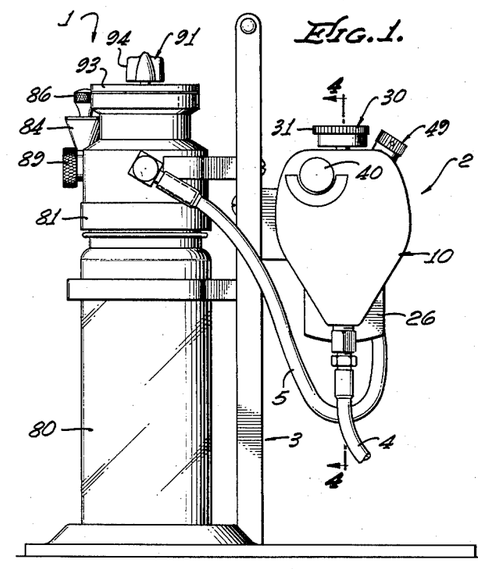
FIG. 1 is a side elevation of apparatus embodying the present invention.
Figure 2:
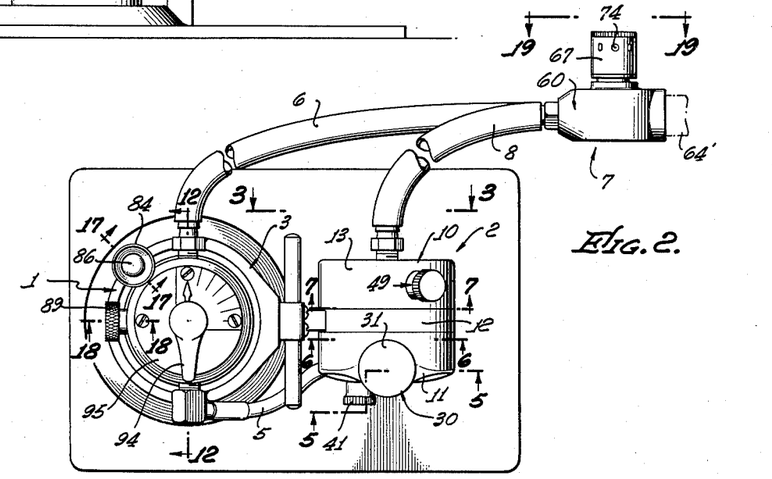
FIG. 2 is a top plan view of the apparatus shown in FIG. 1.
Figure 3:
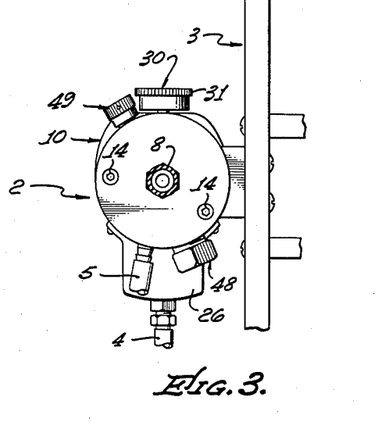
FIG. 3 is a sectional view taken on the line 3—3 of FIG. 2.
Figure 4:
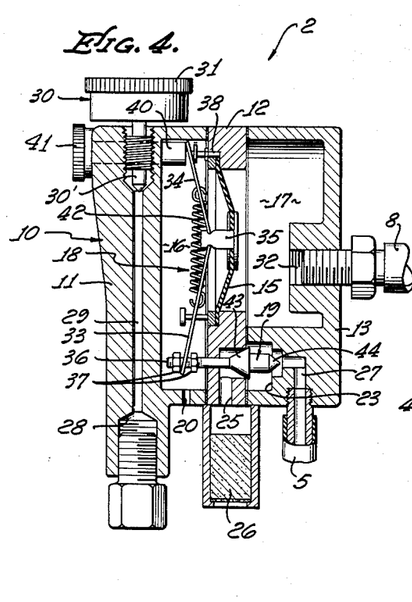
FIG. 4 is a schematic sectional view taken substantially on the line 4—4 of FIG. 1, but with the toggle-diaphragm unit schematically positioned in the assembly for clarity of illustration.
Figure 5:
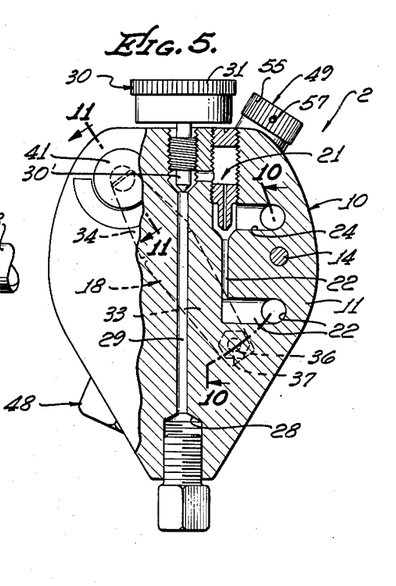
FIG. 5 is a fragmentary sectional view taken substantially on the line 5—5 of FIG. 2.

With reference to the drawings, particularly FIGS. 1, 2 and 3, it will be seen that the present invention generally comprises a dispensing unit 1 for an anesthetic, a resuscitator unit 2 and a stand or support 3 on which said units are mounted in operative association one with the other.

Gas under pressure, for example oxygen, is supplied to the resuscitator unit 2 through a flexible hose line 4 leading from a source of supply of such gas not shown.

A flexible hose line 5 is arranged to conduct gas from the resuscitator unit 2 to the dispensing unit 1.

A flexible dispensing hose 6 leads from the dispenser unit 1 to a combined exhalation and fluid pressure safety valve unit 7 to which latter a mask or other gas administering device, not shown, may be connected in any suitable manner.

From the valve unit 7, a flexible hose 8 leads to the resuscitator unit 2 to complete the circuit between the patient's lungs and the resuscitator unit for the cyclical functioning of the resuscitator unit in a manner which will be hereinafter fully described.

A control head 9 on the dispensing unit 1 is selectively operable to cause a metered mixture of the anesthetic and gas to be dispensed through the hose 6 to the patient or to direct pure oxygen to the patient. This control head is also operable to regulate the percentage of the anesthetic in the mixture.

Figure 10:
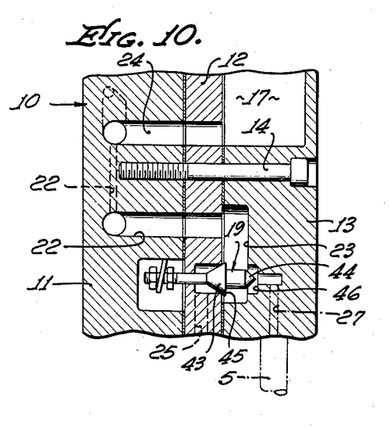
FIG. 10 is a fragmentary sectional view taken substantially on the line 10—10 of FIG. 5.
Figure 11:
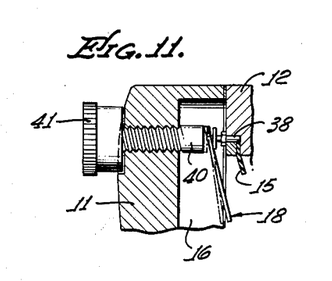
FIG. 11 is a fragmentary sectional view taken substantially on the line 11—11 of FIG. 5 showing how the toggle adjusting means is operable to regulate the action of the toggle mechanism.

The resuscitator unit 2 as shown in FIGS. 3–7, 10 and 11 includes a housing 10 made up of sections 11, 12 and 13 held in assembled relation by means of fastenings, one of which is shown at 14 in FIG. 10. These housing sections are constructed to form with a diaphragm 15, chambers 16 and 17. The diaphragm is secured in any suitable manner as a gas-tight partition between the two chambers.

The chamber 16 houses spring-loaded toggle mechanism 18 operatively connected with the diaphragm 15 and the housing section 12 respectively. The toggle mechanism 18 is connected with valve 19 which will be hereinafter described in detail. This valve is operable to direct oxygen or gas under pressure for effecting cyclical operation of the resuscitator unit on inhalation and exhalation phases. The toggle mechanism 18 is actuated with a snap action for operating the valve 19 responsive to movements of the diaphragm as effected by differential fluid pressures in the chambers 16 and 17. In this connection it should be noted that the section 11 of the housing 10 is provided with a vent port 20 communicating the chamber 16 with the atmosphere whereby atmospheric pressure will actuate the diaphragm when a subatmospheric pressure is developed in the chamber 17.

Mounted in the section 11 of the housing 10 is a jet pump or venturi unit 21 from which a passage 22 leads to a valve chamber 23 for the valve 19, formed in the housing section 13. A combined suction and discharge passage 24 leads from the venturi means 21 into the chamber 17 and is operable to produce negative pressure in the chamber 17. The passage 24 also conducts exhalation gas from the chamber 17, into passage 22, thence through the valve chamber 23 and discharge port 25 in a wall of this chamber. On the exhalation phase of the resuscitator unit, the port 25 discharges gas to the atmosphere through a muffler 26 which latter reduces the noise of discharge of the gas. In addition the valve chamber 23 is provided with a port 27 to which is connected the hose line 5 leading to the anesthetic dispenser 1.

The valve generally indicated by the reference numeral 19 in the valve chamber 23 operates to direct gas through the vent port 25 or through the discharge port 27 depending upon the position of the diaphragm 15, as will be hereinafter fully described.

The line 4 for supplying oxygen or other gas is connected with the intake end 28 of a passage 29 leading through the housing section 11 to the venturi means 21. An oxygen control unit 30 in the form of a needle valve 30′, for controlling the flow of gas to the venturi means 21, is operable in the passage 29 and is provided with a handle 31 operable exteriorly of the housing. The valve 30′ is movable between an "off" position shutting off the flow, and "slow," "medium," and "fast" flow positions.

Suitable markings may be made on the handle to indicate these positions.

The chamber 17 in the housing 10 is provided with a port 32 to which the hose line 8 is connected to complete a flow circuit between the resuscitator unit 2 and the patient through the dispenser unit 1, which circuit will be hereinafter fully described.

The toggle mechanism 18 comprises a pair of toggle arms 33 and 34 fulcrumed at opposed ends on lugs 35 carried by the diaphragm 15. The outer end of the arm 33 is bifurcated and embraces the stem 36 of the valve 19 between a pair of nuts 37. The outer end of the arm 34 is bifurcated and embraces a pin 38 between a stop member and an adjusting screw 40. The screw 40 has a handle 41 operable from the exterior of the housing to adjust the screw so that the toggle arm 34 may be moved to change the position of the toggle mechanism thereby permitting operation at different gas pressures. In this way the toggle mechanism may be set to operate, for example at pressures of the order of from 13 mm. to 20 mm. of mercury. A retractile spring 42 is connected with the toggle arms 33 and 34 in the conventional manner to effect a snap action when these arms are moved past center.

The valve 19, as here shown, includes a pair of valve members 43 and 44 on the stem 36. The valve member 43 is adapted to seat against a seat 45 to shut off flow of gas to the vent port 25 when the valve member 44 is unseated from its seat 46, thereby causing gas to pass through port 27 and into hose line 5 leading to the dispenser unit 1. When the valve member 44 is seated the valve member 43 is unseated, thereby directing the flow of gas through the vent port 25. Thus, on the inhalation or positive pressure cycle, gas is directed through port 27 into hose line 5, whereas on the exhalation cycle, gas in directed through the vent port 25 while the venturi means 21 creates a negative pressure in the chamber 17 necessary for evacuating the lungs of the patient.

Before describing the construction and operation of the dispenser unit 1, other control means provided on the resuscitator unit will now be described. As is customary with resuscitators of the character here shown, a negative pressure safety check valve unit, generally indicated by the reference numeral 48, of conventional form is connected with the chamber 17 to open in case a negative pressure, which may prove injurious to the patient, is developed in the chamber 17. The valve unit 48, shown in FIGS. 6 and 7, may be adjusted so that it may be set to open at a negative pressure calculated to be excessive.

Positive pressure safety valve provisions are embodied, as will be hereinafter described, in the exhalation valve unit 7 connected with the hose lines 6 and 8. The safety action of the valve unit is such that in case a positive pressure is developed which may be injurious, the excessive pressure will be vented to the atmosphere.

Figures 6, 7, 7A:
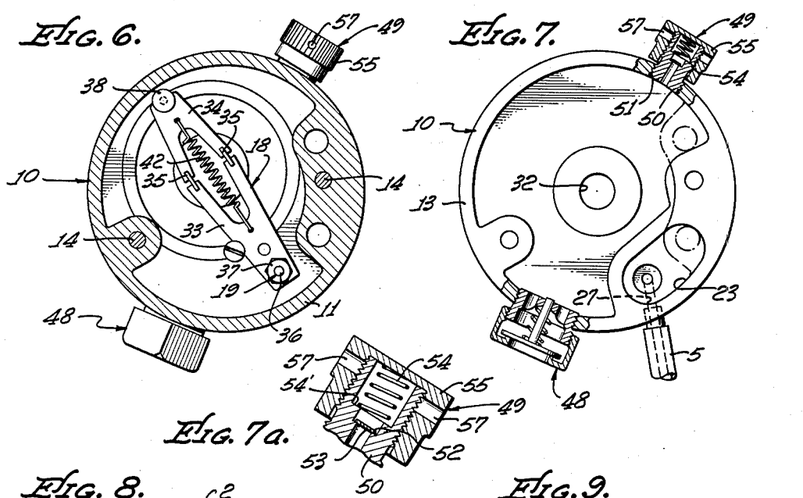
FIG. 6 is a sectional view taken on the line 6—6 of FIG. 2.
FIG. 7 is a sectional view taken on the line 7—7 of FIG. 2.
FIG. 7a is a fragmentary sectional view of the continuous inflation valve.

Another important control provided in the resuscitator unit 2 comprises a continuous inflation or insufflation valve unit generally indicated by the reference numeral 49 which makes it possible quickly to change the resuscitator unit to operate on a continuous inflation phase for inflating the lungs of a patient, for example during thoracic surgery. Accordingly, the valve unit 49, as shown in FIG. 7, comprises a tubular valve body 50 threadedly secured in an opening 51 in the wall of the chamber 17 and being open at both ends. Between its ends the bore of the body 50 is provided with a valve seat 52 for a floating disk valve element 53. A spring 54 is confined in the bore of the body 50 between a shoulder 54' and a screw cap 55 axially adjustable on the body 50. This spring holds the screw cap against unintentional turning and the lower end thereof acts as a stop when the valve disk 53 is unseated. The cap 55 may be unscrewed to uncover ports 57 in the cap so as to communicate the bore of the body with the atmosphere, whereby gas under pressure will be vented from the chamber 17, thereby reducing the pressure in the chamber 17 below the pressure required to actuate the diaphragm 15. During this discharge of gas, the valve element 53 is unseated by the pressure of the gas thereagainst. However, the valve element 53 is necessary to assure that the change to the insufflation or positive pressure phase will take place in case the valve cap 55 is moved to open position when the device is on the exhalation or negative pressure phase. In such case, the valve element 53 will close and permit negative pressure to be developed in the chamber 17 for actuating the diaphragm 15 and toggle valve means 18 to produce the positive pressure phase. Once this phase is developed the valve 53 will open and remain open so that the apparatus will continue to operate on such phase as long as the valve unit 49 is open. The closing of the valve unit 49 will restore the resuscitator unit to cyclical operation.

Figure 19:
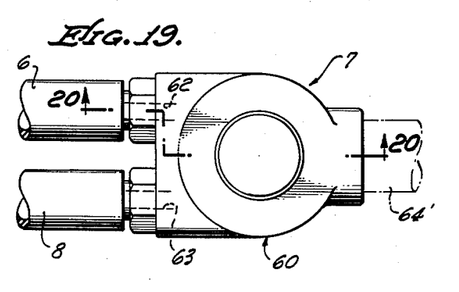
FIG. 19 is a plan view of that part of the apparatus embraced by line 19—19 of FIG. 2, particularly showing the exhalation valve.
Figure 20:
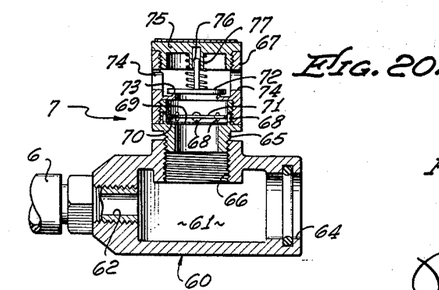
FIG. 20 is a sectional view taken on the line 20—20 of FIG. 19.

The exhalation valve unit 7, although remote from the resuscitator unit 2, is, in effect, a control element for the resuscitator unit and is shown in detail in FIGS. 19 and 20. This valve unit includes a main housing 60 providing a chamber 61 having at one end a pair of ports 62 and 63 to which the hose lines 6 and 8 are connected. At the other end of the chamber 61, a port 64 provides for communication of the chamber 61 with a hose 64' leading to a mask or other device, not shown, for establishing communication between the chamber 61 and the lungs of a patient. In this connection it should be noted that if desired the mask or other device may be attached by means of the hose 64' to the housing 60.

The valve provisions in the exhalation valve unit 7 are contained in a tubular valve housing 65 which is threaded into an opening 66 in the main housing 60. The valve housing 65 is open at both ends and has a cap 67 threadedly connected with its outer end so as to be movable axially thereon between positions covering and uncovering a series of discharge ports 68 in the outer end portion of the valve housing 65. When the ports 68 are uncovered by screwing the cap 67 outwardly, gas will escape through the ports 68 to the atmosphere as a light disk valve 69 moves off its seat 70 by the pressure of gas in the chamber 61. Thus, gases exhaled by a patient will escape to the atmosphere through the ports 68, provided these openings are uncovered. The disc valve 69 is limited in its unseating movement by means of a snap ring 71 mounted in the housing 65 to act as a stop.

When the resuscitator is operated cyclically to introduce gas under pressure into the patient's lungs and withdraw gas from the lungs, as in the induced automatic breathing cycle, the screw cap 67 is screwed down to close the ports 68. When the cap 67 is positioned in this manner, a spring-loaded check valve 72, normally seated on a seat 73 in the cap, is operable to allow gas under excessive pressure to escape through openings 74 in the cap. This check valve is spring loaded to open when a predetermined excessive positive pressure is developed in the chamber 60, thereby venting the excess pressure to the atmosphere. The top wall 75 of the cap 67 is threadedly connected with the cap and serves as a guide for a stem 76 of the valve, as well as a keeper for the spring 77 surrounding the stem. Axial adjustment of the top wall 75 may be effected to regulate the force of the spring 77 whereby the valve will open at a predetermined pressure calculated to be excessive.

Referring now to the anesthetic dispensing unit 1, it will be seen with reference to FIGS. 1, 2 and 12–18 that it includes a transparent and suitably calibrated receptacle 80 for a liquid anesthetic, such as ether. This receptacle is closed at its upper end by the control head unit 9 which is in the form of a flanged closure cap. The head 9 is removably threadedly engaged with a ring 81 fixed on the mouth of the receptacle in hermetically sealed relation thereto, there being a sealing gasket 82 between the ring 81 and the control head 9.

Figure 17:
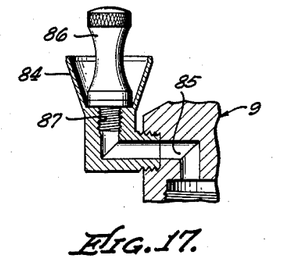
FIG. 17 is a fragmentary sectional view taken on the line 17—17 of FIG. 2.
Figure 18:
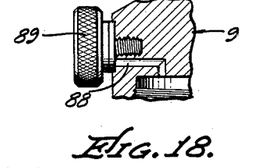
FIG. 18 is a fragmentary sectional view taken on the line 18—18 of FIG. 2.

As shown in FIGS. 1, 2 and 17, a funnel 84 is connected with a filling port 85 (FIG. 17) in the control head 9 to provide for the introduction of a liquid anesthetic into the receptacle 80. A screw closure member 86 is provided for closing the screw threaded intake opening 87 in the funnel 84, to seal the receptacle with the required amount of the anesthetic therein. An air bleed port 88, see FIG. 18, controlled by a rotatable screw valve member 89 is provided in the head 9 to allow air to escape from the receptacle 80 while introducing the anesthetic into the receptacle. This bleed port is closed after charging the receptacle with the ether.

Figure 12:
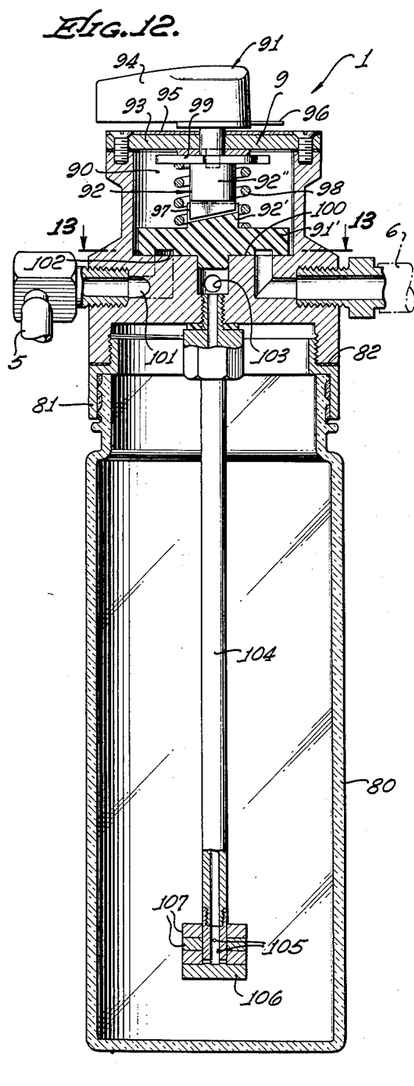
FIG. 12 is a sectional view taken substantially on the line 12—12 of FIG. 2.

As shown in FIG. 12, a chamber 90 is provided in the upper part of the control head 9 for a rotary control valve 91 including a valve disk 91'. A stem 92 of the valve extends through a closure plate 93 detachably mounted on the head as the upper wall of the chamber 90. A handle 94 on the stem 92 provides for moving of the valve 91 into positions for controlling the flow of gas relative to the chamber 90. A dial 95 is mounted on the plate 93 and suitably marked to indicate on and off positions of the valve 91, there being a pointer 96 on the handle to indicate the valve position for controlling the flow relative to the chamber 90.

The valve stem 92 is made in two sections, keyed as at 97 to one another, so that the section 92' on the valve disk 91' and this valve disk are movable axially as a unit relative to the section 92" which latter is suitably rotatably supported on the closure plate 93 so as to be restrained against axial movement. With this arrangement, a coiled spring 98, confined on the stem 92 between a flange 99 on the stem section 92" and the valve disk 91' will urge the valve against a machined and ported surface on the bottom 100 of the chamber 90 to assure a fluid tight contact with such surface.

Figure 13:
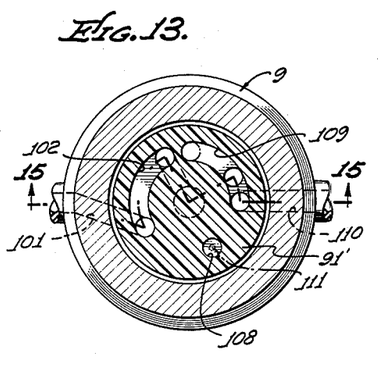
FIG. 13 is a sectional view of the valve mechanism taken on the line 13—13 of FIG. 12.

With reference to FIGS. 12 and 13, it will be seen that gas from the resuscitator unit will pass through the hose line 5 into an intake port 101 formed in the head 9 so as to open into the chamber 90 beneath the valve disk 91'. When the valve is in the "on" position shown in FIGS. 12, 13 and 15, the dispenser unit 1 will operate to dispense a mixture of the gas (oxygen) and the anesthetic. The oxygen entering the port 101 will flow (see FIGS. 13 and 15) into an arcuate groove 102 in the bottom of the valve disk 91', thence into a port 103 formed in the head so as to conduct the oxygen into a tube 104 (see FIG. 12) connected with port 103. The tube 104 extends toward the bottom of the receptacle 80 so as to be submerged in the anesthetic. Adjacent its closed lower end, the tube 104 is provided with a series of axially spaced outlet orifices 105 for releasing the oxygen into the body of the anesthetic in the receptacle 80. In order that small amounts of the oxygen will be released as bubbles into the anesthetic, the tube 104 supports, on a flange 106 at its lower end, a series of metal washers 107 which are loosely mounted one upon the other in surrounding relation to the orifices 105. With this arrangement the oxygen will be released between the washers 107 as bubbles into the anesthetic so as to rise therethrough and form a vaporous mixture of oxygen and the anesthetic.

The vaporous mixture developed in the receptacle 80 will flow through (see FIGS. 13 and 15) an outlet port 108 formed in the head 9 so as to discharge through an arcuate groove 109 in the bottom of the valve disk 91', thence through a dispensing port 110 formed in the head 9 so as to conduct the mixture into the hose line 6 leading to the valve unit 7, thence to the patient.

Figure 14:
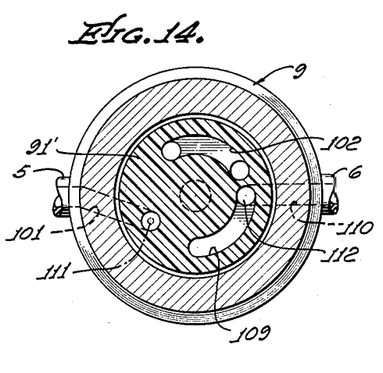
FIG. 14 is a sectional view corresponding to FIG. 13 showing the valve mechanism in a different position than in FIG. 13.
Figure 15:
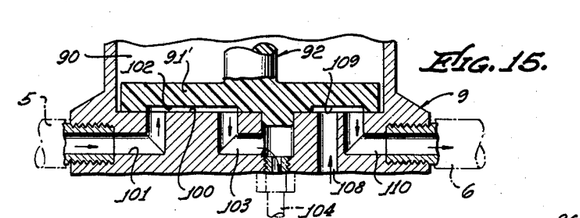
FIG. 15 is a developed sectional view taken substantially on the line 15—15 of FIG. 13.
Figure 16:
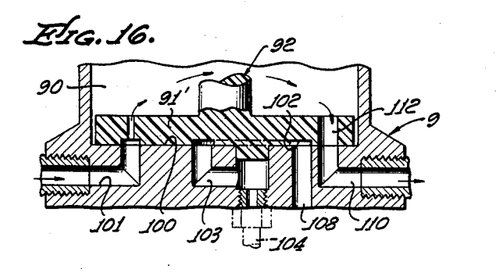
FIG. 16 is a developed sectional view similar to FIG. 15 showing the valve mechanism in the position shown in FIG. 14.

When the valve 91 is in the "off" position, pure oxygen will be passed through the chamber 90 in the head 9 into the hose line 6, thence to the patient. FIGS. 14 and 16 show how the oxygen will by-pass the receptacle 80 when the valve 91 is in the "off" position. The oxygen entering the port 101 will then pass through a port 111 extending axially through the valve, so as to enter the chamber 90 above the valve. From the chamber 90 the oxygen will flow through another port 112 extending axially through the valve, thence into the dispensing port 110 and through the hose line 6 to the patient.

It should be noted that the valve 91 is movable through a considerable range in the "on" position whereby the proportion of oxygen to anesthetic in the vaporous mixture may be varied.

*Operation*

Figure 8:
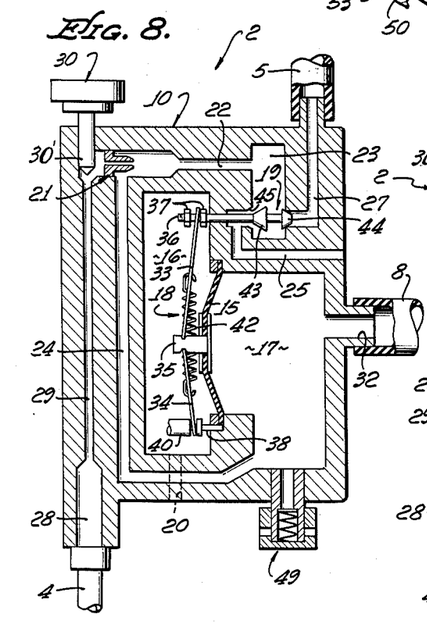
FIG. 8 is a schematic view of the resuscitator unit showing the position of parts thereof during the negative pressure or exhalation cycle of the unit.
Figure 9:
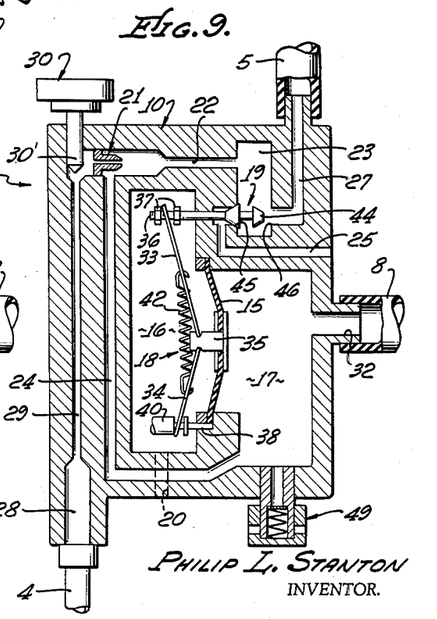
FIG. 9 is a schematic view of the resuscitator unit showing the position of parts thereof during the positive pressure or inhalation cycle of the unit.
Figure 21:
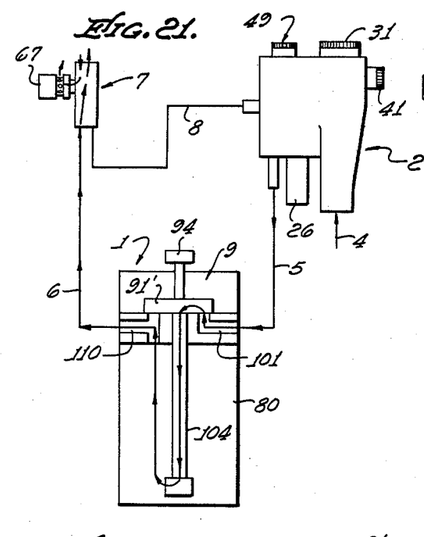
FIG. 21 is a diagrammatic view of the apparatus as it would appear when operated to administer an anesthetic and oxygen to a patient capable of breathing, and without cyclical operation of the resuscitator valve.

When it is desired to operate the unitary apparatus of the present invention, for example as shown by the diagram in FIG. 21, to administer an anesthetic mixture according to the inhalation efforts of a patient, the oxygen control valve 30 on the resuscitator unit 2 is turned to an open position, the cap 67 of the inhalation valve unit 7 screwed outwardly to open the ports 68, and the control valve 91 on the dispenser unit 1 is fully opened. The control valve 49 is closed. Assuming that the receptacle 80 contains an anesthetic, for example ether, the apparatus will now function as follows: oxygen will flow through the supply hose line 4 into the passage 28 (see FIGS. 8 and 9) and pass through the venturi unit 21 thence into the chamber 23 or out through the vent port 25 depending upon the position of the valve 19. If the valve 19 is in the position shown in FIG. 8, closing the passage 27 leading to the hose line 5, the resuscitator unit will operate on the exhalation cycle, the oxygen then passing out through the port 25 while the venturi means 21 functions through the passage 24 to develop a sub-atmospheric pressure in the chamber 17. Incident to development of the sub-atmospheric pressure, the atmospheric pressure in the chamber 16 will move the diaphragm 15 into the position shown in FIG. 9. When the diaphragm 15 is moved in this manner, the toggle mechanism 18 moves the valve 19 to close the vent port 25 and open the port 27 whereby the resuscitator unit will operate on the inhalation cycle and, as will be hereinafter explained, will continue to operate on this cycle to cause oxygen to flow from the venturi means 21 through the passages 22 and 27 into the hose line 5 thence into the intake port 101 in the control head 9. With the control valve 91 on the unit 1 in an "on" or open position, the oxygen will flow (see FIG. 15) from port 101, through groove 102 in the valve 91', the port 103 in the head 9 and into tube 104 (see FIG. 12) so as to bubble into the liquid anesthetic through the orifices 105. The mixture of anesthetic and oxygen developed in the receptacle 80 will now flow out through (see FIG. 15) the port 108 in the head 9 into groove 109 in the valve disk 91', thence through port 110 into the hose line 6 leading to the patient and through the exhalation valve unit 7.

It should be noted that, when the cap 67 of the valve unit 7 is unscrewed so as to uncover the ports 68, the resuscitator unit 2 is rendered inoperable to cycle. Accordingly, the operator must regulate the flow of oxygen in accordance with the acceptance of the mixture by the patient. This can be accomplished by the manipulation of the control valve 30 on the resuscitator unit. Usually the valve 30 is adjusted to the "slow" position so that the oxygen flow will not exceed the inhalation capacity of the patient.

During the inhalation effort of the patient, the disc valve 69 in the valve unit 7 is held closed by the inhalation effort of the patient. However, should the flow of the anesthetic mixture or the oxygen entering the patient's lungs produce a pressure in the chamber 61 sufficient to unseat the valve 69, then the port 68 will vent this pressure to the atmosphere so that the pressure will not be effective in the chamber 17 of the resuscitator unit to trip the diaphragm 15 from the position shown in FIG. 9. Thus the resuscitator unit on the inhalation cycle continues the administering of the anesthetic mixture to the patient as long as the ports 68 are open in the manner next above noted. When the patient exhales the disc valve 69 is unseated and the exhalation gas is vented to the atmosphere through ports 68.

During this operation of administering an anesthetic mixture, the control valve 91 on the dispenser unit 1 may be adjusted as desired to vary the anesthetic mixture in accordance with the need of the patient. These controls make it possible for the opertaor to bring the patient to the desired depth of anesthesia and to maintain such depth.

When anesthesia is no longer required, the control valve 91 on the dispenser unit 1 may be moved to the "off" position so that pure oxygen will be administered to the patient to eliminate the effects of the anesthetic. If resuscitation is necessary, this can be accomplished by merely screwing down the cap 67 of the valve unit 7 whereupon the resuscitator unit will commence its cyclical operation to resuscitate the patient with a mixture of anesthetic and oxygen or, if desired, with pure oxygen.

Figure 22:
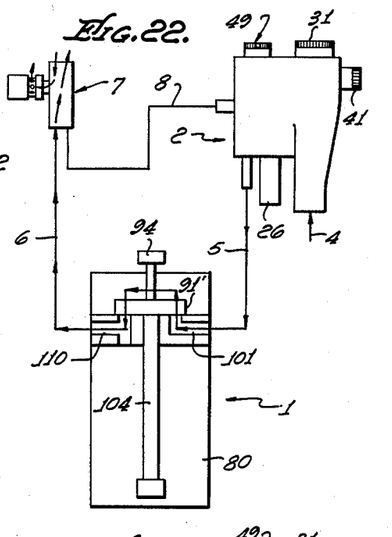
FIG. 22 is a diagrammatic view of the apparatus as it would appear when operated to administer oxygen without the anesthetic to a patient capable of breathing and without cyclical operation of the resuscitator.

FIG. 22 shows diagrammatically how the apparatus operates when administering pure oxygen. When this takes place, the flow of oxygen from the resuscitator unit passes as shown in FIG. 16 from the intake port 101 in the head 9 through the port 111 to enter the chamber 90 above the valve 91, thence through ports 112 and 110 and the hose line 6 to the patient. As in the case of administering an anesthetic mixture, the ports 68 are uncovered while administering pure oxygen and the resuscitator unit continuously operates on the inhalation phase, the patient then exhaling through the ports 68.

Figures 23, 23A, 24:
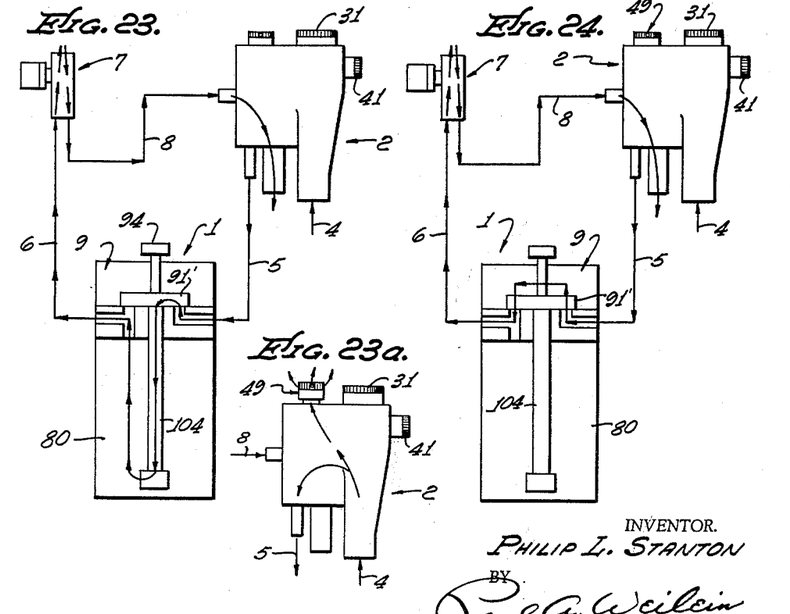
FIG. 23 is a diagrammatic view of the apparatus at it would appear when operating to exert predetermined positive and negative intra-pulmonary pressures while administering an anesthetic gas or vapor in combination with oxygen.
FIG. 23a is a diagrammatic view indicating how the resuscitator unit may operate to change the cyclical operation of the apparatus, when operated as shown in FIG. 23, so that the apparatus will function to continuously insufflate the lungs of a patient to maintain the lungs at the desired degree of inflation.
FIG. 24 is a diagrammatic view of the apparatus as it would appear when operated as a resuscitator to exert predetermined positive and negative intra-pulmonary pressure with pure oxygen.

When it is desired to administer the anesthetic by a resuscitation operation, in other words, during cyclically induced breathing, the apparatus is adjusted to operate as shown in FIG. 23. This is accomplished by screwing down the cap 67 of the valve unit 7 so that the ports 68 are closed and by opening the valve 30 on the resuscitator unit to the desired position, as well as similarly opening the control valve 91 on the dispenser unit 1. In this operation, oxygen will flow through the unit 1 in the same manner as previously described to create an anesthetic mixture passing to the patient. When the pressure of the administered mixture in the patient's lungs reaches a predetermined value, for example of the order of 13 mm. of mercury, this pressure is reflected through the hose line 8 to the chamber 17 of the resuscitator unit so as to trip the diaphragm 15 from the position shown in FIG. 9 to the position shown in FIG. 8, thereby changing the resuscitator unit to the exhalation cycle. During the exhalation cycle, the gas withdrawn from the patient's lungs passes through the hose line 8 into the chamber 17 thence through the passages 24, 22 and discharge port 25 to the atmosphere. In discharging to the atmosphere, the gas is passed through the muffler 26 as indicated in FIG. 23. When a predetermined sub-atmospheric pressure is developed in the chamber 17, the atmospheric pressure in the chamber 16 becomes effective to trip the diaphragm 15 and thus cause the resuscitator to operate again on the inhalation or positive pressure cycle. Thus this cyclical operation is repeated as long as the flow of oxygen to the resuscitator unit continues.

FIG. 24 indicates diagrammatically how the apparatus is operated to resuscitate with pure oxygen. As previously described, the oxygen entering the dispenser unit 1 will by-pass the anesthetic containing vessel 80 and pass through the control head 9 when the control valve 91 on the head is moved to the "off" position as indicated in FIG. 24.

The apparatus may be operated on another and very important phase which has to do, particularly, with thoracic surgery. As previously explained in this description, it is frequently desired to inflate the lungs of a patient during such surgery. It is also desired to maintain the lungs in an inflated state under control of the operator or surgeon. This may be accomplished by merely adjusting the valve 49 so that the ports 57 in the cap 55 of this valve will communicate with the bore through the valve housing 50. Additionally it is necessary that the cap 67 of the valve unit 7 be screwed down to close the ports 68. In other words, with the apparatus adjusted as shown in FIG. 23, it is only necessary to unscrew the cap 55 to open the ports 57 as indicated in FIG. 23a to provide for continuous insufflation of the patient's lungs for maintaining the lungs inflated. Usually in preparing for this operational phase, the toggle adjusting screw 40 is moved to a position which will adjust the toggle arm 34 and toggle unit 18 in a predetermined manner whereby a greater pressure than ordinarily required during resuscitation is necessary to trip the diaphragm 15. As an example, the adjusting screw 40 is manipulated so that it may be disposed in any position of adjustment such as will make necessary a pressure of the order from 13 mm. of mercury to 20 mm. of mercury, to be developed in the chamber 17 before the diaphragm 15 will be tripped. It is assumed that a pressure of 20 mm. of mercury is the maximum pressure that safely may be used. When this pressure or any pressure predetermined by the adjustment of the screw 40 is reached during continuous insufflation of the lungs, the positive pressure safety valve 72 in the unit 7 will open and vent the excessive pressure, or the diaphragm 15 will be tripped to cause operation of the resuscitator unit on the exhalation cycle, thereby relieving the pressure if the valve 72 does not open.

It should be noted that the apparatus of this invention is a compact unit capable of being placed conveniently on an operating table in a position where it readily may be controlled by the surgeon or an anesthetist; it is portable and subject to efficient use as a general purpose resuscitator or as an efficient means for administering an anesthetic and controlling respiration of a patient during and after the administering of the anesthetic.

I claim:

1. Apparatus for administering an anesthetic and controlling respiration of a patient comprising: a container for an anesthetic; a passage leading from said container for communication with the lungs of the patient; gas flow control means connected with said container and optionally operable to route gas without anesthetic content through said passage for delivery to the patient's lungs or to route a regulated amount of gas into said container and from said container with an anesthetic content, into said passage for delivery to the patient's lungs; a gas operated resuscitator unit operated by pressure within the lungs of a patient, said unit being optionally operable for cyclically creating positive and negative pressures or for continuously discharging gas therefrom; a second passage for conducting gas through said resuscitator unit to said flow control means for said optional routing of said gas; a third passage connected with said resuscitator unit for communication with the lungs of the patient; said third passage operable independently of said first mentioned passage for discharging gas from the lungs of the patient through said resuscitator unit; a valve unit connected with said resuscitator unit including a vent port, a manually operable valve component and a gas pressure responsive valve component; said manually operable component being movable into and from a position for opening said vent port, said gas pressure responsive component opening responsive to positive gas pressure in said resuscitator unit and closing responsive to negative pressure in said resuscitator unit, while said manual component is opened; and valve means connected with said third passage means optionally movable between a closed position and a position permitting exhalation gas to vent to the atmosphere.

2. Apparatus for administering an anesthetic and controlling respiration of a patient comprising: a container for an anesthetic; a control head connected with said container; said head having a gas intake port; a passage connected with said head for conducting gas to the lungs of a patient; means connected with said head optionally operable to pass gas from said port into said passage or to pass gas from said port through a regulated amount of anesthetic and thence as a mixture of gas and anesthetic through said passage means; a gas-operated resuscitator unit operated by pressure in the lungs of a patient, said unit being operable for cyclically creating positive and negative pressures therein as well as to continuously discharge gas therefrom without cycling; said resuscitator having a vent port through which exhalation gas from the patient's lungs may be discharged to the atmosphere; a passage extending through said resuscitator unit for conducting gas during said cycling phase and during said continuous discharge phase through said intake port for delivery to the patient; and another passage connected with said resuscitator unit for conducting exhalation gas from the patient to said resuscitator unit independently of said first mentioned passage for discharge through said vent port; and a valve in said last named passage optionally operable to vent exhalation from the patient to the atmosphere.

References Cited in the file of this patent

UNITED STATES PATENTS

| | | |
|---|---|---|
| 912,532 | Brat | Feb. 16, 1909 |
| 1,120,673 | Bayer | Dec. 15, 1914 |
| 2,042,474 | McKesson | June 2, 1936 |
| 2,268,172 | Sinnett | Dec. 30, 1941 |
| 2,408,136 | Fox | Sept. 24, 1946 |
| 2,452,670 | Meidenbauer | Nov. 2, 1948 |
| 2,737,176 | Fox | Mar. 6, 1956 |
| 2,907,322 | Hay | Oct. 6, 1959 |

FOREIGN PATENTS

| | | |
|---|---|---|
| 204,840 | Germany | Dec. 7, 1908 |